(12) United States Patent
Oto et al.

(10) Patent No.: US 7,785,745 B2
(45) Date of Patent: Aug. 31, 2010

(54) FUEL CELL APPARATUS

(75) Inventors: Katsuya Oto, Asaka (JP); Tomohiro Hirayama, Ome (JP); Terumasa Nagasaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/203,827

(22) Filed: Sep. 3, 2008

(65) Prior Publication Data

US 2009/0142630 A1 Jun. 4, 2009

(30) Foreign Application Priority Data

Nov. 30, 2007 (JP) ............................. 2007-311343

(51) Int. Cl.
*H01M 8/04* (2006.01)
*H01M 8/00* (2006.01)

(52) U.S. Cl. ....................... 429/431; 429/430; 429/432; 429/413

(58) Field of Classification Search .................. 429/12, 429/13, 23, 430, 432, 413
See application file for complete search history.

(56) References Cited

U.S. PATENT DOCUMENTS

2004/0175602 A1* 9/2004 Tahara ........................ 429/23

FOREIGN PATENT DOCUMENTS

| JP | 2005-056764 | 3/2005 |
|---|---|---|
| JP | 2005-115553 | 4/2005 |
| JP | 2005-123110 | 5/2005 |
| JP | 2006-286321 | 10/2006 |
| JP | 2006-351325 | 12/2006 |
| JP | 2007-265840 | 10/2007 |
| JP | 2007-280741 | 10/2007 |
| JP | 2007265840 A * | 10/2007 |

OTHER PUBLICATIONS

Japanese Application No. 2007-311343 Office Action mailed Dec. 18, 2008 (English translation).

* cited by examiner

*Primary Examiner*—Dah-Wei D Yuan
*Assistant Examiner*—Zachary Best
(74) *Attorney, Agent, or Firm*—Blakely, Sokoloff, Taylor & Zafman LLP

(57) ABSTRACT

According to one embodiment, a fuel cell apparatus includes a cell stack of an active direct methanol type, and a DC-DC converter configure to receive output voltage of the cell stack and to control an output current of the cell stack so that the output voltage of the cell stack becomes greater than a lower-limit threshold Vt and the output current of the cell stack lies in a range of $I_1$ to $I_2$ ($<I_1$).

7 Claims, 5 Drawing Sheets

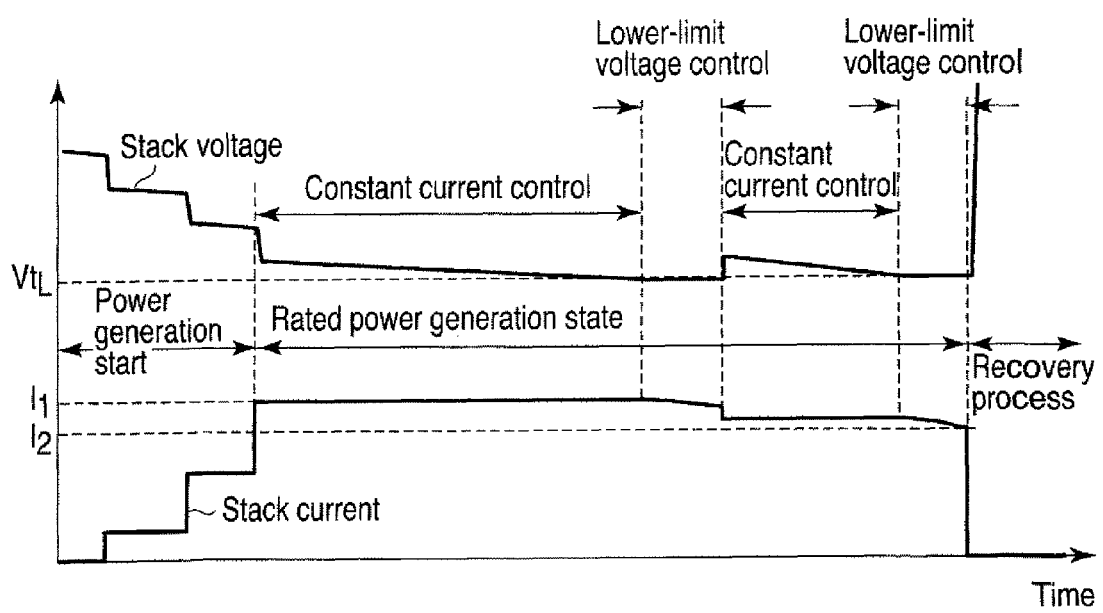
F I G. 6

FUEL CELL APPARATUS

CROSS-REFERENCE TO RELATED APPLICATIONS

This application is based upon and claims the benefit of priority from Japanese Patent Application No. 2007-311343, filed Nov. 30, 2007, the entire contents of which are incorporated herein by reference.

BACKGROUND

1. Field

One embodiment of the invention relates to a fuel cell apparatus for use in an electronic apparatus such as a personal computer and to a method of controlling the fuel cell apparatus.

2. Description of the Related Art

Hitherto, in a portable electronic device such as a notebook-sized personal computer, a lithium-ion battery is used as a battery. Recently, also in a portable electronic device, attention is being paid to a fuel cell such as a direct methanol fuel cell (DMFC) as a new power source replacing a lithium-ion battery.

A fuel cell such as a DMFC has a characteristic such that an output voltage decreases as an output current increases. Consequently, the output power of a fuel cell reaches its peak when the output voltage of the fuel cell has a predetermined value. Therefore, many of switching power source circuits each using a fuel cell as a power source operate in a constant voltage control mode for making the output voltage of the fuel cell coincide with a predetermined reference voltage as means for effectively utilizing output power of the fuel cell (refer to Jpn. Pat. Appln. KOKAI Publication No. 2005-56764).

In the device, as the operation time of the fuel cell increases, discharge water increases with a change in output current of a stack. Consequently, a water collecting mechanism is needed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary diagram showing an example of output current and output voltage of the stack.

DETAILED DESCRIPTION

Various embodiments according to the invention will be described hereinafter with reference to the accompanying drawings. In general, according to one embodiment of the invention, a fuel cell apparatus includes a cell stack of an active direct methanol type, and a DC-DC converter configure to receive output voltage of the cell stack and to control an output current of the cell stack so that the output voltage of the cell stack becomes greater than a lower-limit threshold Vt and the output current of the cell stack lies in a range of $I_1$ to $I_2$ ($<I_1$).

Figure 1:
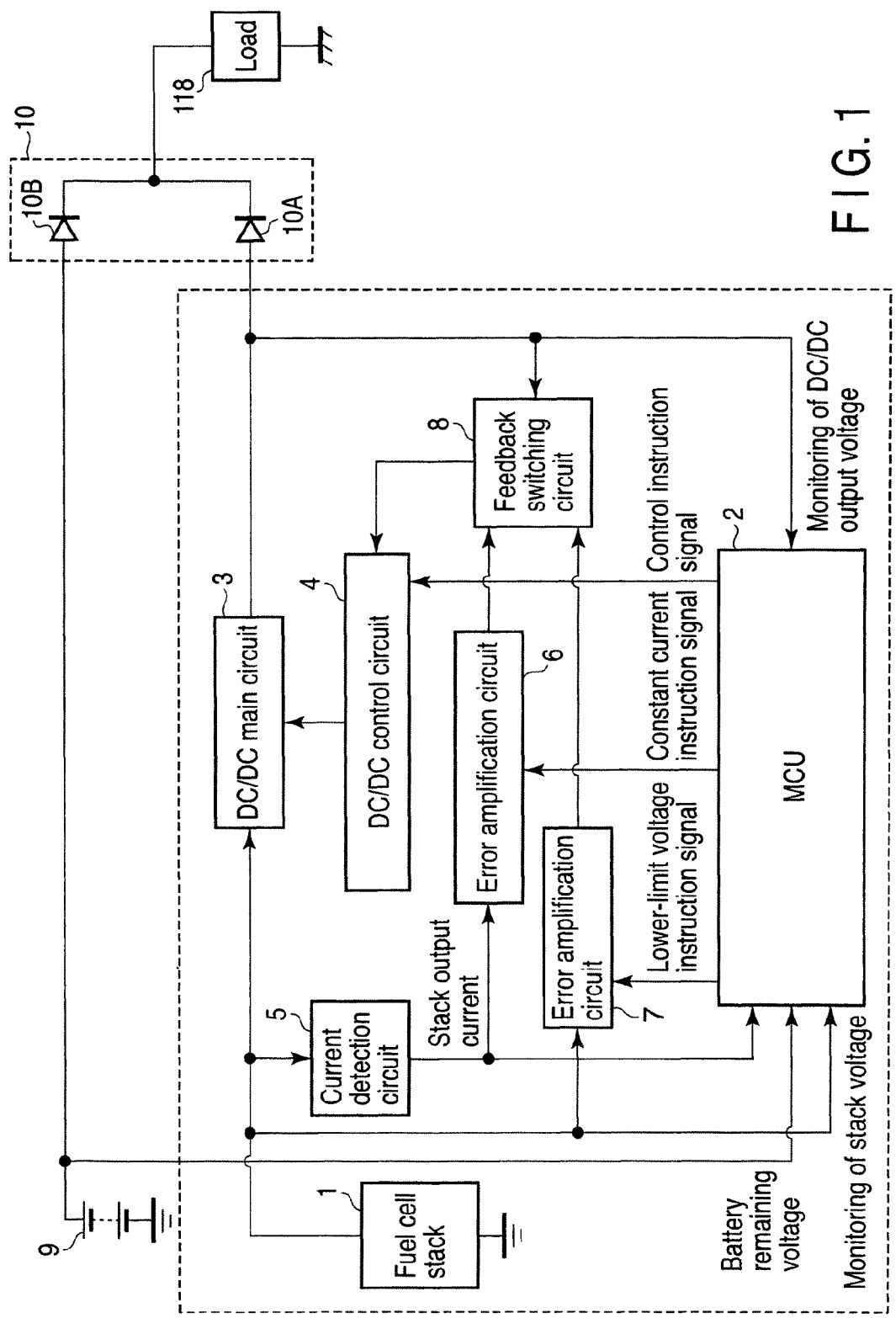
FIG. 1 is an exemplary diagram showing a system configuration of electronic equipment including a fuel cell apparatus according to an embodiment of the present invention.

First, referring to FIG. 1, the system configuration of electronic equipment including a fuel cell apparatus according to an embodiment of the present invention will be described. The fuel cell apparatus is provided, for example, in portable electronic equipment such as a personal computer and generates output power to be supplied as an operation power source to each of components in the electronic equipment.

The fuel cell is, for example, a DMFC or the like. The operation control of the fuel cell is executed by a system control microcomputer unit (MCU) 2. In the case where the fuel cell is a cell stack of an active direct methanol FC (DMFC) type, the system control microcomputer unit 2 controls accessories such as a fuel tank, a mixing tank, a pump and the like and controls power generation of the fuel cell in a centralized manner.

A current detection circuit 5 measures output current of a fuel cell stack 1. The current detection circuit 5 transmits a measurement to the MCU 2 and an error amplification circuit 6. The error amplification circuit 6 computes the difference between the measurement of the current detection circuit 5 and a constant current instruction signal output from the MCU 2, amplifies the difference, and transmits the amplified difference to a feedback switching circuit S.

An output of the fuel cell stack 1 is input to an error amplification circuit 7. The error amplification circuit 7 detects the potential difference between a lower-limit voltage instruction signal output from the MCU 2 and the output voltage of the fuel cell stack 1. The error amplification circuit 7 amplifies the detected potential difference and transmits the amplified difference to the feedback switching circuit 8.

The MCU 2 transmits a control instruction signal to a DC/DC control circuit 4. The DC/DC control circuit 4 outputs a control signal for controlling a DC/DC main circuit 3 to the DC/DC main circuit 3 in accordance with the control instruction signal sent from the MCU 2 and the signal transmitted from the feedback switching circuit 8.

The DC/DC control circuit 4 supplies, to the DC/DC main circuit 3, a pulse signal of a duty ratio which varies according to the magnitude of the voltage of the error signal output from the error amplification circuit 6 or 7 as the control instruction signal. The DC/DC main circuit 3 is a switching-type transformer and has a switch device. The DC/DC main circuit 3 switches the on/off state of the switch device in accordance with the control instruction signal. As a result, the DC/DC main circuit 3 can control the output current of the fuel cell stack 1.

To the DC/DC main circuit 3 as a DC/DC converter, an output of the fuel cell stack 1 is input. The DC/DC main circuit 3 controls the output current so that the output voltage of the fuel cell stack 1 becomes greater than a lower limit threshold Vt, and the output current of the fuel cell stack 1 lies between $I_1$ and $I_2$ ($<I_1$).

More concretely, the DC/DC main circuit 3 operates to perform constant current control or constant voltage control on the output power of the fuel cell stack 1 in accordance with a signal transmitted from the feedback switching circuit 8.

An output of the fuel cell stack 1 is input to the DC/DC main circuit 3. An output of the DC/DC main circuit 3 is input to the MCU 2 and also to a load 118 via a diode 10A of a diode-OR circuit 10. An output of a battery 9 is input to the load 118 via a diode 10B of the diode-OR circuit 10.

The battery 9 and the diode-OR circuit 10 are mounted in an apparatus as the load 118.

Figure 2:
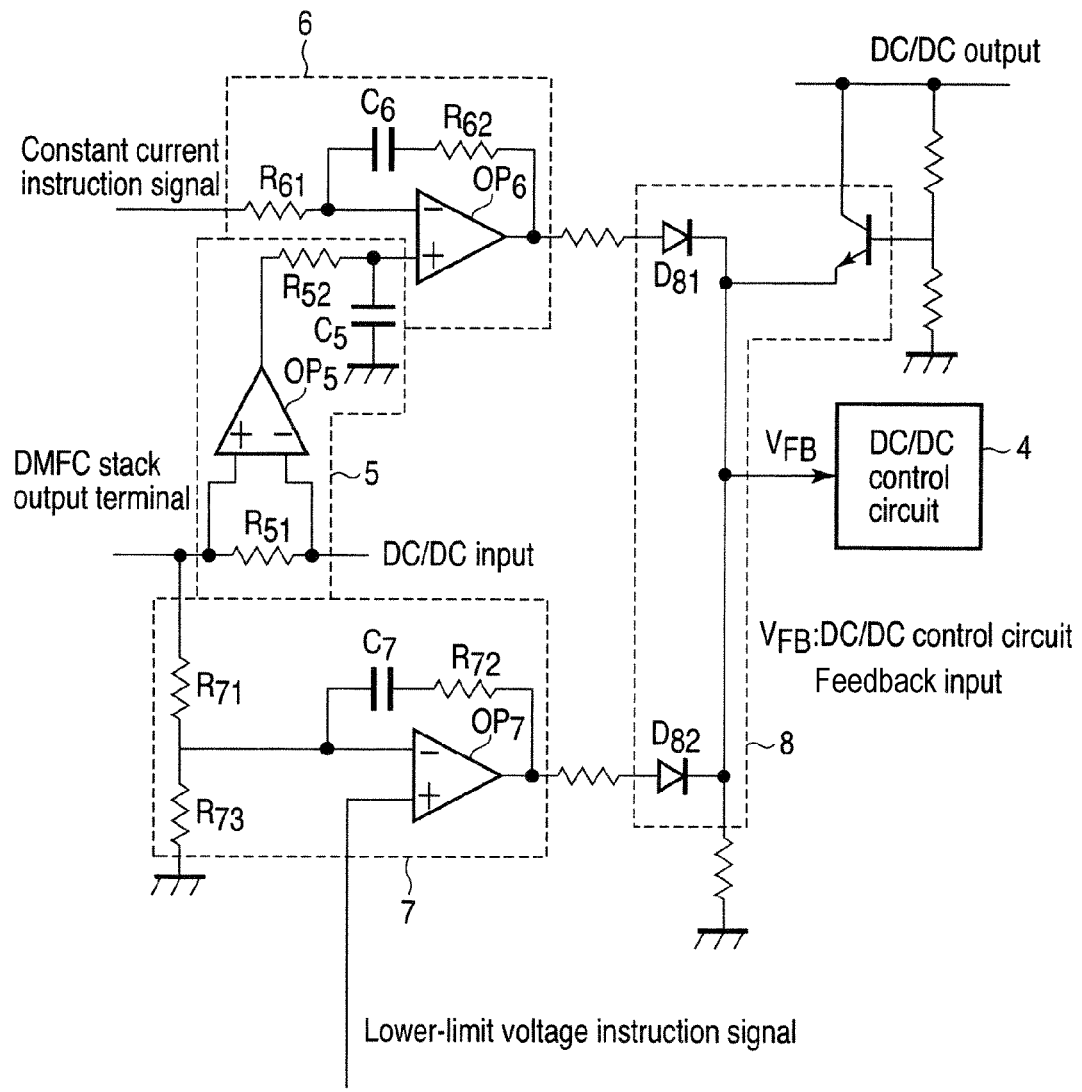
FIG. 2 is an exemplary circuit diagram showing a configuration example of an error amplification circuit, a feedback switching circuit, a current detection circuit, and a DC/DC control circuit.

FIG. 2 shows a configuration example of the error amplification circuits 6 and 7, the feedback switching circuit 8, the current detection circuit 5, and the DC/DC control circuit 4.

As shown in FIG. 2, the current detection circuit 5 is constructed by a filter circuit including a resistor $R_{51}$, an operational amplifier $OP_5$ for measuring a potential difference of resistor $R_{51}$, a resistor $R_{52}$, and a capacitor $C_5$. An output of operational amplifier $OP_5$ is input to the positive side of an operational amplifier $OP_6$ of the error amplification circuit 6 via resistor $R_{52}$.

The error amplification circuit 6 is constructed by a resistor $R_{61}$, an operational amplifier $OP_6$, a capacitor $C_6$, and a resistor $R_{62}$. A constant current instruction signal is input to the negative side of operational amplifier $OP_6$ via resistor $R_{61}$. A series circuit of capacitor $C_6$ and resistor $R_{62}$ is connected in parallel between an output of operational amplifier $OP_6$ and resistor $R_{61}$ and the negative side of operational amplifier $OP_6$.

The error amplification circuit 7 is constructed by a resistor $R_{71}$, an operational amplifier $OP_7$, a capacitor $C_7$, and resistors $R_{72}$ and $R_{73}$. A lower-limit voltage instruction signal is input to the positive side of operational amplifier $OP_7$ via resistor $R_{71}$. An output of the stack is connected to a series circuit of resistors $R_{71}$ and $R_{73}$. The end of resistor $R_{73}$, which is on the opposite side of the input side of the stack, is connected to the earth. An output of the stack is connected to the negative side of operational amplifier $OP_7$ via resistor $R_{71}$. A series circuit of capacitor $C_7$ and resistor $R_{72}$ is connected in parallel between an output of operational amplifier $OP_7$ and resistor $R_{71}$ and the negative side of operational amplifier $OP_7$.

The feedback switching circuit 8 is constructed by diodes $D_{81}$ and $D_{82}$. An output of the error amplification circuit 6 is input to the DC/DC control circuit 4 via diode $D_{81}$ in the feedback switching circuit 8. An output of the error amplification circuit 7 is input to the DC/DC control circuit 4 via diode $D_{82}$ in the feedback switching circuit 8.

In the apparatus of the present invention, the constant current control and the constant voltage control are performed in accordance with the power generation characteristics of the fuel cell stack 1. Prior to description of the constant current control and the constant voltage control, the water transfer coefficient will be described.

The water transfer coefficient is a coefficient related on the volume of water moved from an anode to a cathode when one proton moves from the anode to the cathode of the fuel cell stack 1. Particularly, in a portable fuel cell apparatus, discharge of water is an issue. It is therefore desirable to decrease the coefficient.

A proper range of the water transfer coefficient of the fuel cell stack 1 is set in consideration of the material of the stack, power generation control, and the like. A change in the output current of the stack largely relates to a fluctuation in the water transfer coefficient which is initially set. The volume of water moved from the anode to the cathode of the stack, which changes with lapse of power generation time cannot be controlled, so that a water collecting mechanism is needed.

The apparatus of the invention controls the output current of the fuel cell stack 1 so that the water transfer coefficient lies in a predetermined range, thereby making the water collecting mechanism unnecessary.

Figure 3:
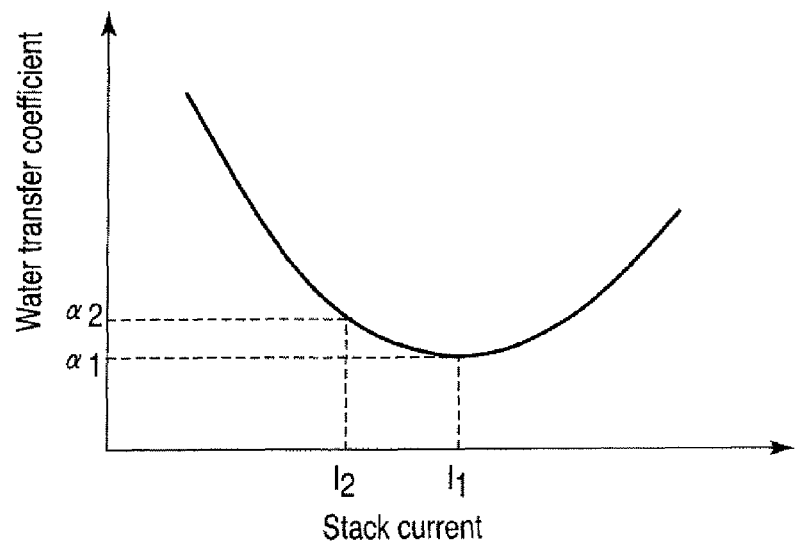
FIG. 3 is an exemplary diagram showing a current-water transfer coefficient curve of a fuel cell stack.

The predetermined range of the water transfer coefficient is obtained from the current-water transfer coefficient curve of the fuel cell stack 1 shown in FIG. 3. It is assumed that the water transfer coefficient lies in the range between $\alpha_1$ and $\alpha_2$ as a request from the fuel cell system side. By $\alpha_1$ and $\alpha_2$, the current controllable range ($I_1$ to $I_2$) is naturally determined. In the range, the constant current control using the value of $I_1$ at which the water transfer coefficient is the lowest is preferable from the viewpoint of system design.

In addition to the constant current control, it is necessary to perform a control to improve stability against polarity inversion of the stack and deterioration by providing the lower limit for the stack output voltage during rated power generation and providing a control circuit mechanism so that the output voltage does not fall below the lower limit even when the power generation characteristics of the fuel cell stack 1 change.

The lower-limit voltage of the stack is obtained by adding the lower limit voltage of one cell. An index of the lower-limit voltage of one cell is, for example, 0.3V. Therefore, the lower-limit voltage of the stack is determined according to the number of cells. For example, when the number of cells constructing the stack is 10, the lower-limit voltage is 3V. When the number of cells is 20, the lower-limit voltage is 6V.

Figure 4:
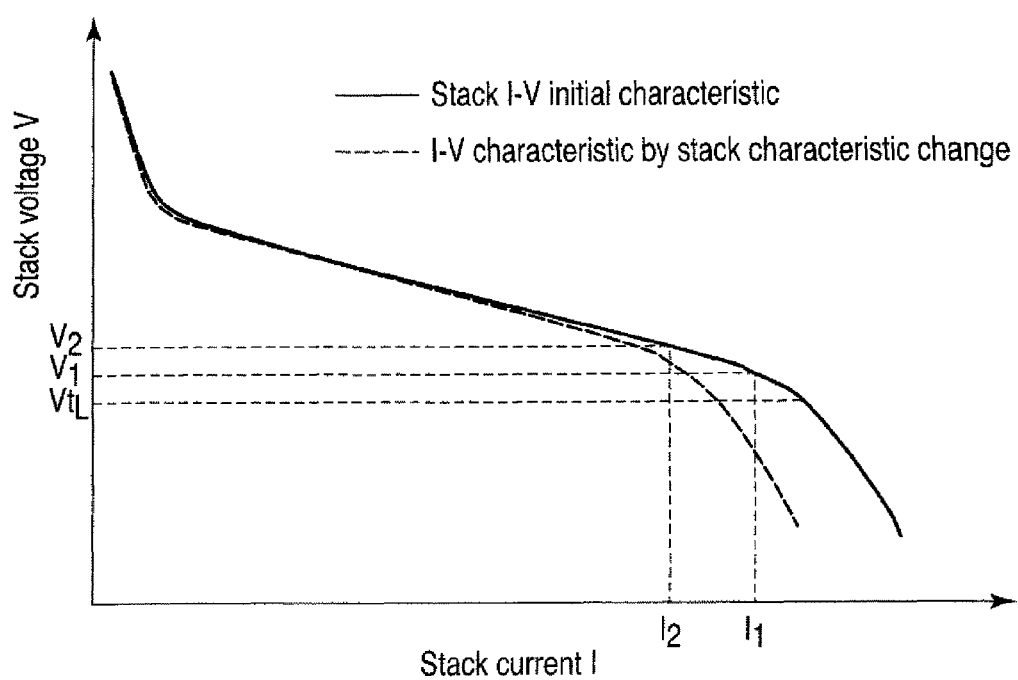
FIG. 4 is an exemplary diagram showing a current-voltage (I-V) curve of the stack.

Referring now to FIG. 4, a control shifting method in the case where the power generation characteristic of the fuel cell stack 1 changes in the constant current control of the fuel cell stack 1 and the constant voltage control is required will be described.

A lower-limit voltage $Vt_L$ of the stack, which is determined by the number of cells in the fuel cell stack 1, is initially set. When a characteristic change (such as cathode flooding) occurs in the stack for some reason and a sharp output voltage drop occurs, the constant current control using the current $I_1$ determined in the above description with reference to FIG. 3 shifts to the lower-limit voltage control using the lower-limit voltage ($Vt_L$) of the stack. In the case where a shift occurs from the constant current control state to the lower-limit voltage control state, the stack constant current set value is set to a value obtained by decreasing the value by $\Delta I_t$, and the decrement is performed until the lower-limit voltage control state is cancelled. The lower-limit voltage control state is detected by the fall of the stack voltage Vt below a threshold $Vt_L'$ slightly higher than the stack lower limit voltage $Vt_L$.

The stack current $I_t$ which is set has to always satisfy the relation $I_2 \leq I_t \leq I_1$. In the case where the relation cannot be satisfied, operation stop or recovery process has to be performed separately.

Next, the rated power generating operation will be described. The stack output current is detected by the current detection circuit 5, the detected stack output current and the constant current instruction It of the MCU 2 are compared with each other, and the error is amplified by the error amplification circuit 6. In the case where the output voltage of the DC/DC main circuit 3 is lower than an upper-limit voltage which is set by the circuit and the output voltage of the stack 1 is higher than the lower-limit voltage $Vt_L'$ set by the lower-limit voltage instruction signal output of the MCU 2, the feedback switching circuit 8 selects the output signal of the error amplification circuit 6 for the constant current control, and inputs it to the DC/DC control circuit 4. As a result, a negative feedback control system for making the output current of the stack 1 follow the constant current instruction signal output from the MCU 2 is constructed. The stack output current converges to a value designated by the MCU 2 and the constant current control state is obtained. As a result, the water transfer coefficient in the stack can be maintained in a predetermined range.

When the stack voltage drops during operation in the above-described control state and reaches the stack lower-limit voltage instruction signal which is output from the MCU 2 to the error amplification circuit 7, an output of the error amplification circuit 7 for comparing the stack voltage and the stack lower-limit voltage instruction with each other, amplifying the error, and outputting the amplified error is input to the feedback switching circuit 8. In this instant, the feedback switching circuit 8 supplies the output of the error amplification circuit 7 for the lower-limit voltage control to the DC/DC control circuit 4, and an output of the error amplification circuit 6 is interrupted. As a result, the negative feedback loop of the stack output current constant control system is switched to a negative feedback loop of the stack output voltage constant control system.

At this time, since the response speed of the error amplification circuits 6 and 7 is much faster than a change in the power generation state of the stack, it can be regarded that the switching of the negative feedback loop shifts without delay. Therefore, the stack voltage converges to the predetermined value without falling below the stack lower limit voltage instruction value designated by the MCU 2, and safety against the polarity inversion phenomenon of the stack can be assured.

Next, the control operation using the relation between the load consumption power and the stack power generation power will be described.

In the rated power generation state of the stack generation power≦load consumption power, the output power of the DC/DC main circuit 3 is almost constant. Consequently, as the load consumption power increases, the output voltage of the DC/DC main circuit 3 decreases. By parallel connection of the battery 9 whose rated output voltage range is within the range of the output voltage of the DC/DC main circuit 3 via the diode-OR circuit 10 that checks current suction, in the case where the output power of the DC/DC main circuit 3 becomes insufficient, parallel feeding of the battery 9 and the DC/DC main circuit 3 is performed. When the load consumption power is equal to the generation power of the stack, the output voltage of the DC/DC main circuit 3 becomes higher than the supply voltage of the battery 9, so that the power is not supplied from the battery 9 to the load. In the case where load consumption power is less than the stack generation power, the output voltage of the DC/DC main circuit 3 increases and is controlled to the upper-limit voltage which is set by the circuit. That is, the feedback switching circuit 8 selects feedback of the output voltage of the DC/DC main circuit 3, and supplies it to the DC/DC control circuit 4, and the DC/DC main circuit 3 is in an output constant voltage control state.

Figure 5:
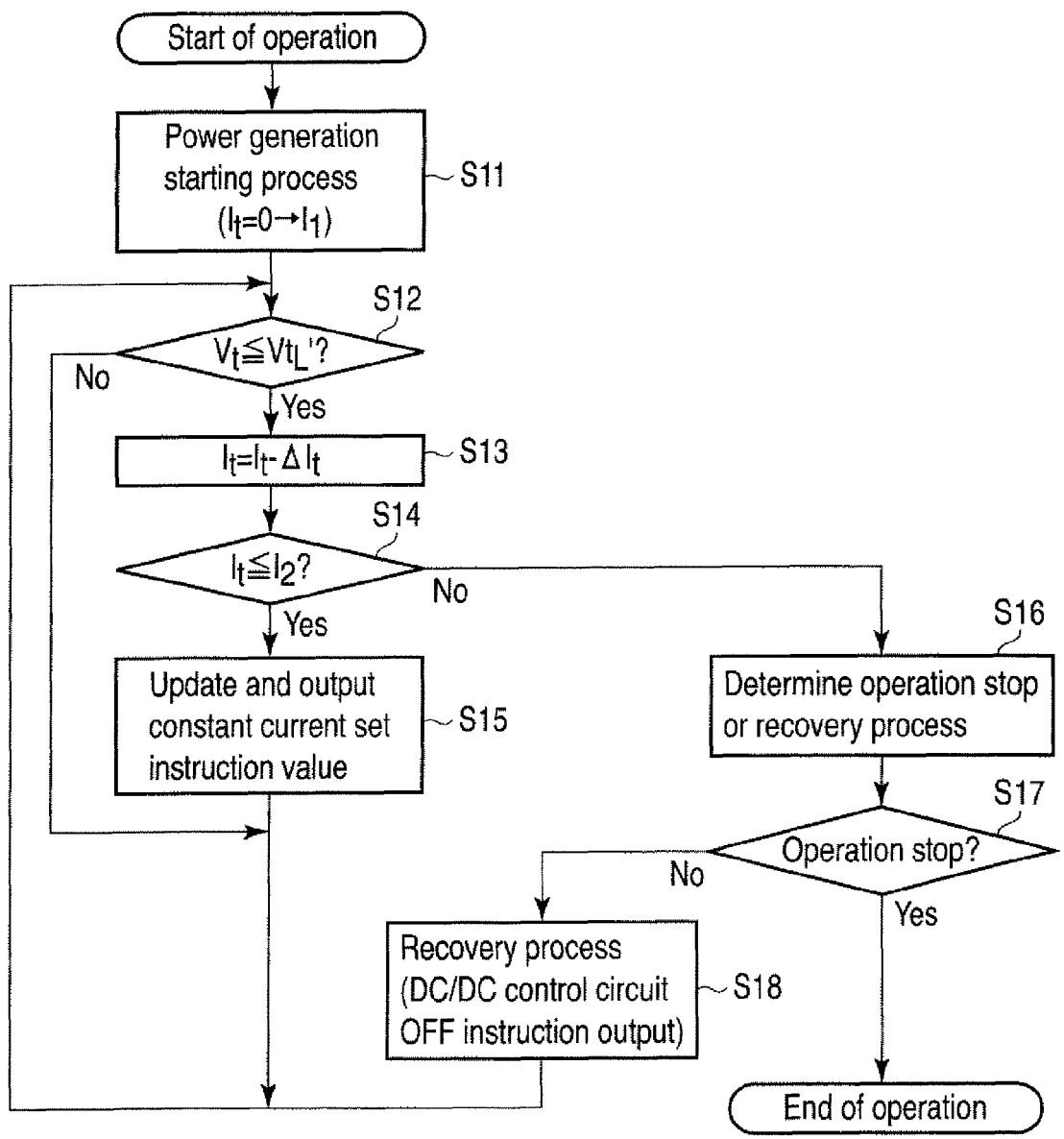
FIG. 5 is an exemplary flowchart showing the control procedure of a fuel cell.

The setting of the stack current, parameter determination, recovery process, and control on operation stop are performed by the microcomputer which generally performs the stack power generation control, and are shown In the flowchart of FIG. 5. FIG. 6 shows an example of the output current and the output voltage of the stack.

When operation starts, the power generation starting process is performed during a period in which the stack output current is from 0 to $I_1$ (block S11). At the start of power generation, the stack output current set value is increased step by step on the basis of the constant current instruction output signal from the MCU 2, and the state shifts to the rated power generation state. When the power generation starting process is finished, while monitoring the output voltage of the stack, the constant current control is performed so that the stack output current becomes the set output current $I_t$ of the stack (the initial value is $I_1$) (block S12). In the case where the output voltage Vt of the stack becomes equal to or less than the stack lower limit voltage threshold $Vt_L'$ (YES in block S12), the set output current It of the stack is set to It−ΔIt (block S13).

Whether the new set output current It is greater than or equal to the upper-limit current $I_2$ of the operation range or not is determined (block S14). When it is determined that the set output current It is greater than or equal to the upper-limit current $I_2$ (YES in block S14), the set output current It is updated to the value obtained in block S13 (block S15).

In the case where it is determined in block S14 that the set output current It is not greater than or equal to the upper limit current $I_2$ (NO in block S14), whether the operation stop or recovery process is performed or not is determined (block S16). A check is made to see whether the determination in block S16 is the operation stop or not (block S17). In the case where it is determined that the determination is not operation stop (NO in block S17), the recovery process is performed (block S18).

The recovery process will be briefly described. In the recovery process, the load of the stack is interrupted (stack output current=0[A]), and supply of air to the stack is stopped until the voltage generated in the cells of the stack decreases sufficiently (about 0.1V). After that, supply of air is started. When the voltage of the stack rises sufficiently, the rated load operation can be performed. The time of the process is about 30 seconds. Normally, the process is necessary once in about one hour. The purpose of the recovery process is to promote reduction of a catalyst in a cell.

In the case where it is determined in block S17 that the operation stop is determined (YES in block S17), the operation is finished.

With the apparatus of the invention, by setting the output current of the stack to a predetermined value according to the power generation control state of the stack, the water transfer coefficient is maintained constant during the rated power generation, and increase in the discharge water with time can be suppressed. Thus, the water collecting mechanism is not required, and the fuel cell system can be simplified. On the other hand, the control can be shifted at sufficiently high speed so that the stack voltage does not fall below the lower-limit voltage at the start time of power generation and during rated power generation. Since the polarity inversion phenomenon of the stack and the like is prevented, power generation control can be performed safely against a failure and deterioration. In the case where the peak load consumption power exceeds the stack generation power, the insufficient amount is supplied from the battery. Consequently, the apparatus of the invention is suitable for a load device having a characteristic that the peak value of the load consumption power is greater than an average value thereof. With the configuration, the fuel cell apparatus can be miniaturized.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A fuel cell apparatus comprising:
 a cell stack of an active direct methanol type, the cell stack comprising an anode and a cathode; and a DC-DC converter configured (i) to receive output voltage of the cell stack, (ii) to control the output voltage which becomes greater than a lower-limit threshold, (iii) to control an output current of the cell stack to be in a range of a second current value to a first current value, the first current value corresponds to a minimum value of a coefficient, the second current value corresponds to a value of the coefficient that makes a water collecting mechanism unnecessary, and the coefficient is a coefficient related to a volume of water moved, (iv) to execute a constant current control so that the output current of the cell stack becomes a third current value in the range of the second current value to the first current value, and (v) to execute a constant voltage control of the output voltage when the output voltage becomes close to the lower-limit threshold during the constant current control.

2. The fuel cell apparatus according to claim 1, further comprising a control circuit configured to change the third current value used for the constant current control performed prior to the constant voltage control to a current outputted from the cell stack in the range of the second current value to the first current value during the constant voltage control.

3. The fuel cell apparatus of claim 1 further comprising:
   a current detection circuit including an output and an input, the input of the current detection circuit being coupled between the cell stack and the DC-DC converter;
   a microcomputer unit including an output and an input, the input of the microcomputer unit being coupled between the cell stack and the DC-DC converter; and
   a feedback switching circuit coupled to the output of the current detection circuit and the output of the microcomputer unit, the feedback switching circuit outputting signals to the DC-DC converter to control the output current of the cell stack.

4. The fuel cell apparatus of claim 3 further comprising a first error amplification circuit coupled to the current detection circuit and the microcomputer unit, the first error amplification circuit including an output that is coupled to a first input of the feedback switching circuit.

5. The fuel cell apparatus of claim 4 further comprising a second error amplification circuit coupled to the cell stack and the microcomputer unit, the second error amplification circuit including an output that is coupled to a second input of the feedback switching circuit.

6. The fuel cell apparatus of claim 1, wherein the DC-DC converter performs a constant current control by setting the output current of the cell stack to a current value (It) that lies in the range between the first current value and the second current value.

7. The fuel cell apparatus of claim 1, further comprising a control circuit which performs a recovery process when the output current of the cell stack approaches the second current value and the output voltage of the cell stack approaches the lower-limit threshold lower-limit threshold, the recovery process interrupting a load of the cell stack and a supply of air to the cell stack.

* * * * *